Oct. 13, 1925.
A. VOLENCE
INNER TUBE
Filed Nov. 7, 1924
1,557,122
2 Sheets-Sheet 1
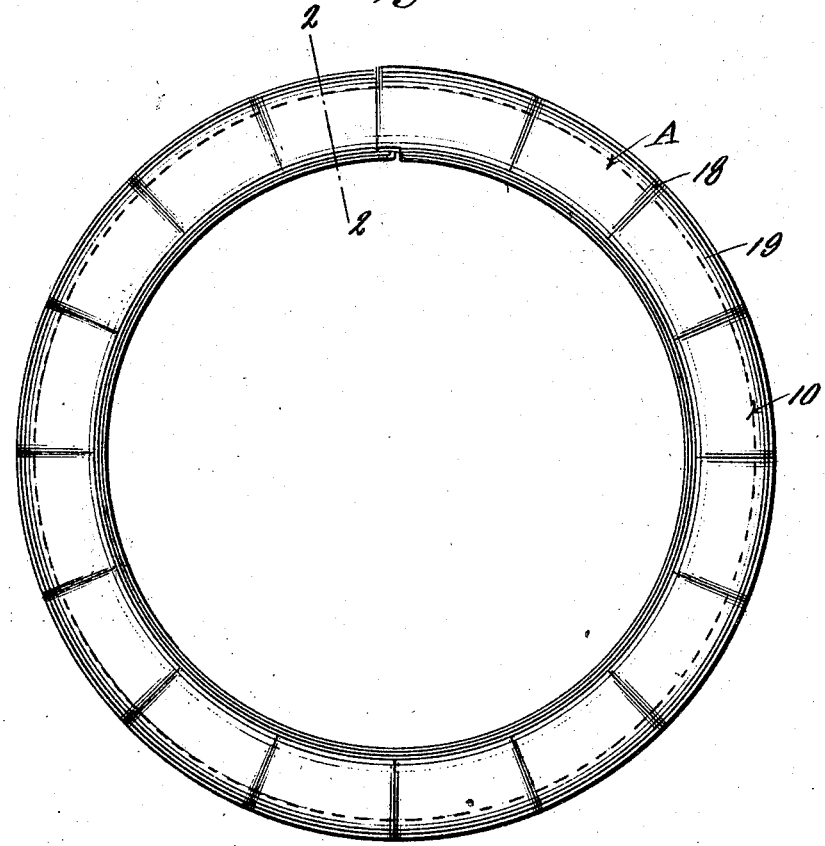
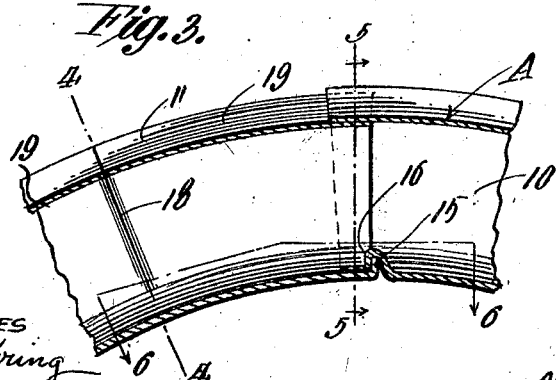
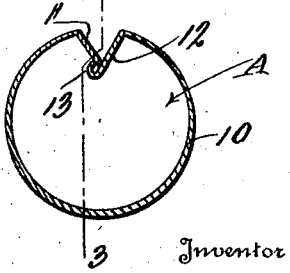
Inventor
ANTHONY VOLENCE Oct. 13, 1925.
A. VOLENCE
1,557,122
INNER TUBE
Filed Nov. 7, 1924
2 Sheets-Sheet 2
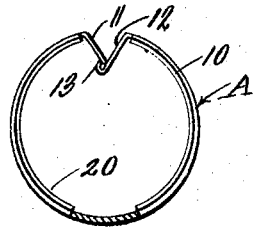
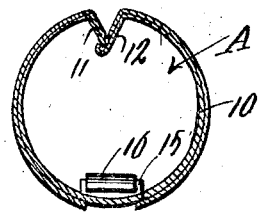
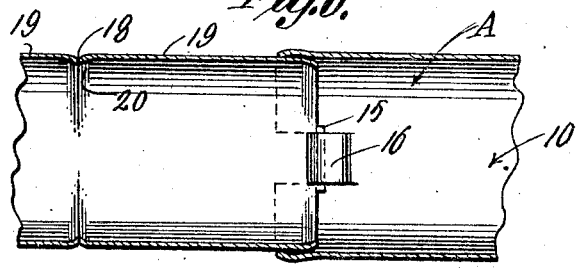
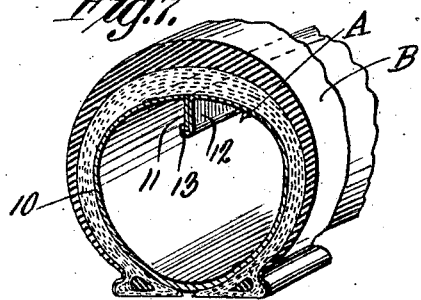
WITNESSES
Inventor
ANTHONY VOLENCE
By Richard B. Owen
Attorney Patented Oct. 13, 1925.

1,557,122

UNITED STATES PATENT OFFICE.

ANTHONY VOLENCE, OF BROWERVILLE, MINNESOTA.

INNER TUBE.

Application filed November 7, 1924. Serial No. 748,450.

*To all whom it may concern:*

Be it known that I, ANTHONY VOLENCE, a citizen of the United States, residing at Browerville, in the county of Todd and State of Minnesota, have invented certain new and useful Improvements in Inner Tubes, of which the following is a specification.

This invention appertains to vehicle tires and the primary object of this invention is to provide a novel device for taking the place of the ordinary pneumatic inner tube of an automobile tire, the device being so constructed as to give the necessary resiliency to the tire without any of the inherent disadvantages of the pneumatic tube.

Another object of the invention is the provision of a resilient steel band arranged to fit within the casing of the tire for holding the casing in an extended condition, the band effectively taking the place of the usual inner tube for adding resiliency to the tire, the band insuring the tire against blowouts, punctures and the like which are contingent with the use of pneumatic inner tubes.

A further object of the invention is to provide an annular metallic tube constructed of spring material provided at equidistantly spaced points with transversely extending division slits forming resilient leaves, the tube being constructed in a novel manner to insure the proper compression thereof incident to the passage of an automobile over a roadway.

A further object of the invention is to provide an inner tube for tire casings embodying an annular resilient metallic body with novel means for detachably locking the terminals of the body together.

A still further object of the invention is to provide an improved spring inner tube for tires of the above character, which will be durable and efficient in use, one that will be simple and easy to manufacture and one which can be placed upon the market and incorporated with an ordinary tire casing at a small cost.

With these and other objects in view, the invention consists in the novel construction, arrangement and formation of parts, as will be hereinafter more specifically described, claimed and illustrated in the accompanying drawings, in which drawings, Figure 1 is a side elevation of the improved inner tube.

Figure 2 is a detail transverse section through the same taken on the line 2—2 of Figure 1.

Figure 3 is a fragmentary longitudinal section taken through the improved inner tube on the line 3—3 of Figure 2 illustrating the novel means for connecting the terminals of the tube together, Figure 4 is a detail transverse section taken on the line 4—4 of Figure 3 illustrating the formation of the resilient leaves of the tube by the transversely extending slits, Figure 5 is a detail section taken on the line 5—5 of Figure 3 looking in the direction of the arrows illustrating the construction employed for detachably connecting the terminals of the tube together, Figure 6 is a detail section taken on the line 6—6 of Figure 3 looking in the direction of the arrows, showing the construction of the improved tube, Figure 7 is a fragmentary perspective view showing the improved tube placed within a tire casing.

Referring to the drawings in detail, wherein similar reference characters designate corresponding parts throughout the several views the letter A generally indicates the improved inner tube and B a tire casing with which the same can be associated. The tire casing B is of the usual or any preferred construction and has simply been shown to illustrate the use of the improved tube A.

The improved tube A is preferably formed of sheet metal of a highly resilient nature and embodies an annular body 10 of substantially circular shape in cross section. If desired the body 10 can be first formed from flat metal and then bowed to provide the circular shape in cross section. This provides a circumferentially extending slot around the body 10 at the outer periphery thereof and the edges of the body at the slot are provided with inwardly directed flanges 11 and 12. The flange 12 is provided with a tongue 13 for engaging the flange 11 in order to prevent the disengagement of the flanges 11 and 12 relative to one another.

It is also preferred to have the body 10 relatively thicker at its inner periphery than at its outer periphery and this insures the correct flexing of the tube incident to the travel of an automobile over a roadway.

I preferably connect the ends of the body 10 together in such a manner that the same can be detached and as shown one end is adapted to be inserted within the other to form the annular body. An upstanding lug 15 is formed on one end of the body as clearly shown in Figure 3 of the drawing at the inner periphery thereof and this lug is adapted to be engaged by a resilient hooked shaped tongue 16 which is adapted to snap over the said lug when the ends of the body are in their telescoped condition.

In order to insure the proper flexing of the tube at one point without unnecessarily distorting the tube at other points, the body is provided at equidistantly spaced points with transversely extending slits 18 which terminate short of the inner periphery of the body, and this provides a plurality of resilient leaves 19 as can be readily seen by referring to the drawings.

The edges of the resilient leaves are bent slightly inwardly as at 20 in order to prevent rupturing of the tire casing B incident to the compressing and expanding of the tube.

When the tube A is inserted within a casing B the tube is compressed and the flanges 11 and 12 will be forced into abutting relation relative to one another as clearly shown in Figure 7 of the drawing. The contracting of the tube insures the proper pressure against the side walls of the casing as well as on the tread of the casing.

The resilient inner tube supports a relatively great weight without collapsing and owing to the inherent nature of the material from which the tube is formed, the easy riding of the vehicle having tires equipped with the inner tubes A is insured.

Changes as to details may be made without departing from the spirit or the scope of this invention, but what I claim as new is:—

1. An inner tube for tire casings constructed from spring material, comprising a body of substantially circular shape in cross section adapted to be flexed to conform to the annular configuration of a tire casing, means detachably connecting the terminals of the body together, the body including a plurality of resilient leaves and having a circumferentially extending slot extending entirely around the same, inwardly directed flanges formed on the walls of the slot, and a hook shaped bead formed on one flange for engaging the inner edge of the other flange to prevent disengagement of said flanges, the body being formed relatively thicker at its inner periphery than at its outer periphery.

2. As a new article of manufacture, an inner tube for automobile tire casings constructed from resilient material including a body bent into a substantially circular shape in cross section, the edges of the body extending circumferentially around the body at the outer periphery thereof, inwardly directed abutting flanges formed on the circumferential edges of the body, a hooked shaped bead formed on one flange for engaging the other flange, the body having transversely extending slots formed therein at spaced points forming resilient leaves.

3. As a new article of manufacture, an inner tube constructed from spring material comprising a body substantially circular shaped in cross section, the body being adapted to be flexed into an annular configuration including a plurality of resilient leaves having their free edges disposed outermost for engaging the tread portion of a tire casing, and means detachably connecting the terminals of the body together.

In testimony whereof I affix my signature.

ANTHONY VOLENCE.